United States Patent [19]
Boyd

[11] Patent Number: 5,575,832
[45] Date of Patent: Nov. 19, 1996

[54] REGENERATIVE HYGROSCOPIC FILTER AND METHOD

[75] Inventor: Steven T. Boyd, Athens, Canada

[73] Assignee: Humidtech Research, Inc., Athens, Canada

[21] Appl. No.: 310,149

[22] Filed: Sep. 21, 1994

[51] Int. Cl.[6] .................... B01D 50/00; B01D 53/02
[52] U.S. Cl. .................... 95/91; 55/274; 55/524; 55/DIG. 17; 55/DIG. 34; 95/117; 95/123; 95/211; 95/285; 96/118; 96/134; 96/141; 96/189
[58] Field of Search .................. 95/19, 21, 91, 95/117, 121, 122, 123, 148, 211, 93, 285; 96/113, 118, 120, 134, 135, 141, 143, 144, 147, 188, 189, 191, 219, 153, 154; 55/274, 385.1, DIG. 17, 486, DIG. 34, 524

[56] References Cited

U.S. PATENT DOCUMENTS

| | | | |
|---|---|---|---|
| 2,801,706 | 8/1957 | Asker | 95/123 |
| 3,279,151 | 10/1966 | Kauer, Jr. et al. | 95/122 |
| 3,303,621 | 2/1967 | Hill | 96/119 |
| 3,505,794 | 4/1970 | Nutter et al. | 55/524 |
| 3,653,181 | 4/1972 | Becker | 95/91 |
| 3,705,480 | 12/1972 | Wireman | 96/136 |
| 3,714,763 | 2/1973 | Suzuki | 96/144 |
| 3,728,848 | 4/1973 | Vest | 96/147 |
| 3,891,417 | 6/1975 | Wade | 96/139 |
| 3,934,238 | 1/1976 | Pavlov | 55/274 |
| 4,079,675 | 3/1978 | Beumel | 102/401 |
| 4,231,768 | 11/1980 | Seibert et al. | 96/128 |
| 4,254,731 | 3/1981 | Taylor | 55/274 |
| 4,327,936 | 5/1982 | Sekiguchi | 96/144 |
| 4,370,152 | 1/1983 | Luper | 96/119 |
| 4,388,086 | 6/1983 | Bauer | 95/118 |
| 4,487,617 | 12/1984 | Dienes et al. | 96/113 |
| 4,504,289 | 3/1985 | Waller | 55/316 |
| 4,548,624 | 10/1985 | Waller | 55/274 |
| 4,659,467 | 4/1987 | Spearman | 210/282 |
| 4,677,929 | 7/1987 | Harris | 114/211 |
| 4,688,511 | 8/1987 | Gerlach et al. | 55/274 |
| 4,689,057 | 8/1987 | Gasper | 55/275 |
| 4,726,817 | 2/1988 | Roger | 95/115 |
| 4,764,189 | 8/1988 | Yanagawa et al. | 96/144 |
| 5,034,040 | 7/1991 | Walcott | 96/118 |
| 5,042,468 | 8/1991 | Lambert | 128/200.26 |
| 5,089,119 | 2/1992 | Day et al. | 210/167 |
| 5,092,911 | 3/1992 | Williams | 95/117 |
| 5,110,330 | 5/1992 | Loughron | 96/134 |
| 5,131,387 | 7/1992 | French et al. | 128/205.27 |
| 5,190,569 | 3/1993 | McGrath | 55/218 |

*Primary Examiner*—Jay H. Woo
*Assistant Examiner*—Duane S. Smith
*Attorney, Agent, or Firm*—Jaeckle, Fleischmann & Mugel

[57] ABSTRACT

A regenerative hygroscopic filter having a housing containing an inlet port and an outlet port, and, a hydrophilic filter element positioned within the housing and disposed between the inlet and outlet ports, and operatively arranged to filter solid particulate matter and water when gas passes into the inlet port and through the filter element, and to release water via the inlet port when gas passes from the outlet port through the filter element.

13 Claims, 6 Drawing Sheets

REGENERATIVE HYGROSCOPIC FILTER AND METHOD

BACKGROUND OF THE INVENTION

The present invention relates generally to filters, and is directed more particularly to a filter which filters both solid particulates and water from air when the air passes through the filter in one direction, and which releases water to air when the air passes through the filter in a second direction, thereby regenerating the water-removing capability of the filter.

In a typical hydraulic power system, hydraulic fluid is stored in a reservoir. The fluid level in the reservoir rises and falls as the fluid is used in the system. When the fluid level falls in the reservoir, a vacuum is created, and ambient air enters the reservoir through a filtered vent. It is essential that water and dust particles be removed or filtered from the incoming air, as water and dust contaminate the fluid and cause abrasive wear and corrosion of the system components. When the fluid level rises in the reservoir, the air in the chamber is pumped out of the vent.

Simple filters which remove only airborne particles are well known in the art. These filters usually comprise a housing having an inlet port and an outlet port, and a filter element disposed between the respective ports to remove solid particles.

Filters which remove moisture only are also known. These filters typically use some sort of desiccant to remove the moisture from an air stream. For example, U.S. Pat. No. 3,303,621 (Hill) discloses a gas drier which uses a deliquescent desiccant to dry air. However, in filters of this nature, the desiccant has a finite life and must be replaced periodically.

Filters which remove both airborne particulates and moisture are also known in the art. U.S. Pat. No. 4,504,289 and its continuation U.S. Pat. No. 4,548,624 (Waller) disclose a hygroscopic breather cap which contains two knitted fabric filters to remove dust particles from air entering a petroleum tank, and also contains a solid desiccant to remove moisture. In this filter the air passes through the filter in one direction, and the desiccant has a finite capacity. When the desiccant becomes saturated, it must be replaced.

What is needed, then, is a filter which removes airborne contaminants and moisture from air when air passes through the filter in a first direction, and yet regenerates its capacity to filter moisture when air passes through the filter in a second direction.

SUMMARY OF THE INVENTION

The present invention comprises a regenerative hygroscopic filter having a housing containing an inlet port and an outlet port, and, a hydrophilic filter element positioned within the housing and disposed between the inlet and outlet ports, and operatively arranged to filter solid particulate matter and water when gas passes into the inlet port and through the filter element, and to release water via the inlet port when gas passes from the outlet port through the filter element.

It is accordingly a primary object of the present invention to provide a novel regenerative hygroscopic filter which is capable of removing both airborne particulates and water from air entering a hydraulic fluid reservoir, and releasing water to the atmosphere when air passes from the reservoir through the filter to the atmosphere.

It is a further object of the invention to provide a filter having a filter element which is regenerative in nature, that is, its capacity to remove water from air which passes through the filter in a first direction is restored when dry air passes through the filter in a second direction. This regenerative feature is intended to extend the life of the filter element.

It is another object of the invention to provide a filter having a unique visual indicator which provides indication that the filter element requires replacement, without exposing the contents of the hydraulic reservoir or the desiccant to the atmosphere.

It is still a further object of the invention to provide a filter having a combination air/water filter element.

It is yet another object of the invention to provide a filter having separate air and water filter elements, wherein the water filter element is regenerative.

BRIEF DESCRIPTION OF THE DRAWINGS

These and other objects, features and advantages of the present invention will be readily apparent from the specification, claims and drawings in which:

DETAILED DESCRIPTION OF THE PREFERRED EMBODIMENTS

Figure 1:
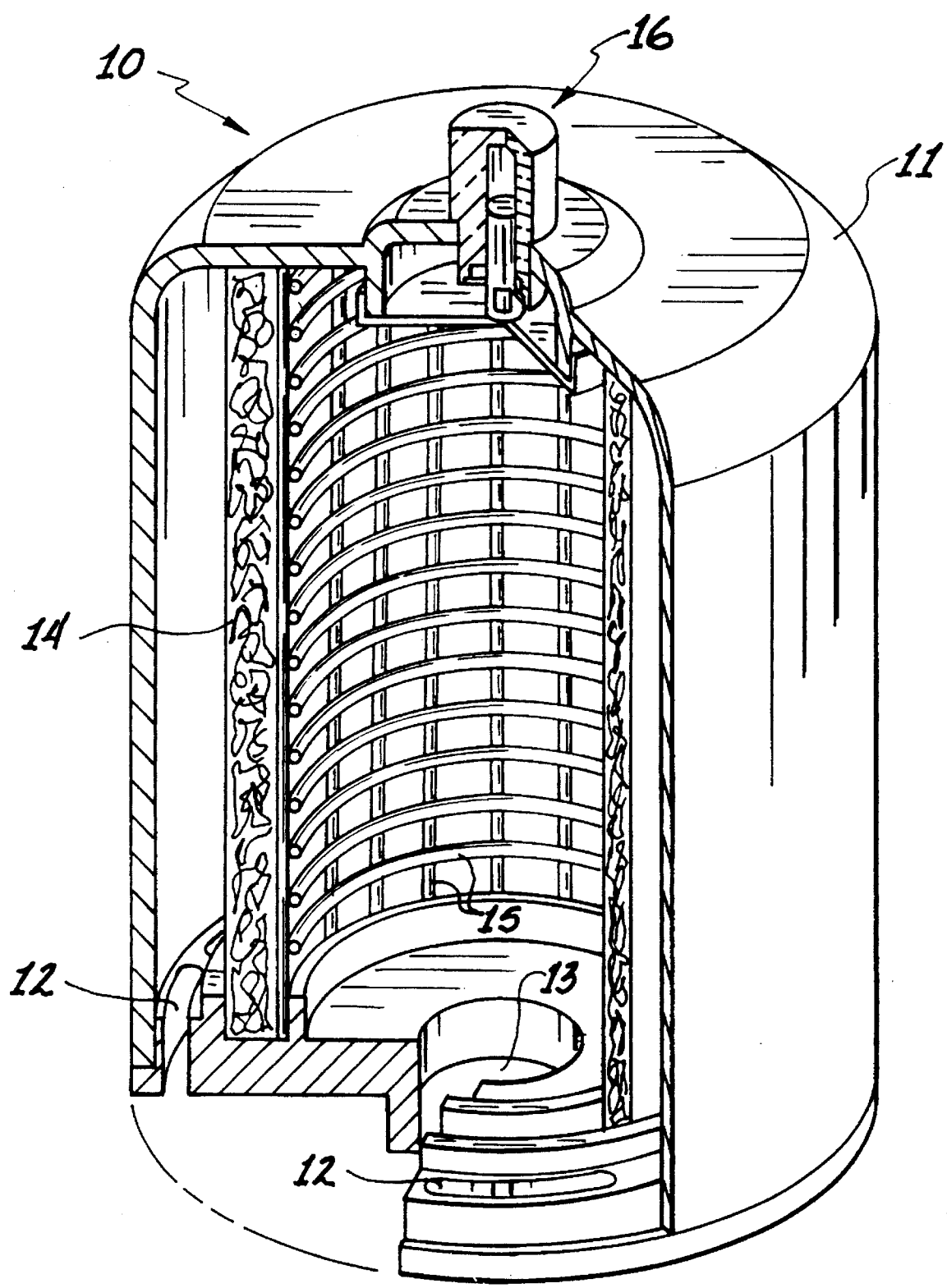
FIG. 1 is a perspective view of a first embodiment of the present invention, with a section cut away.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification.

As used in this description, the following definitions apply: "Hygroscopic": pertains to a marked ability to accelerate the condensation of water vapor; "Hydrophilic": having an affinity for, absorbing, wetting smoothly with, tending to combine with, or capable of dissolving in water; "Gas": the state of matter distinguished from the solid and liquid states by very low density and viscosity, relatively great expansion and contraction with changes in pressure and temperature, the ability to diffuse readily, and the spontaneous tendency to become distributed uniformly throughout any container; including but not limited to "air";

"Deliquescent": an adjective which describes the chemical process of dissolving and becoming liquid by absorbing moisture from the air;

"Desiccant": a substance, such as calcium oxide or sulfuric acid, that has a high affinity for water and is used to absorb moisture.

"Regenerative": refers to the ability of the filter element of the present invention to become refreshed or renewed as air cycles in and out of the filter;

Adverting now to the drawings, FIG. 1 illustrates in a perspective view a first embodiment of the present invention, with a section cut away. Filter 10 generally comprises a housing 11 having an inlet port 12 and an outlet port 13. The embodiment shown actually has a plurality of inlet ports 12 each of which comprises an annular-shaped slot. The filter also includes a hydrophilic filter element 14 interposed between the inlet and outlet ports, and operatively arranged to filter solid particulate matter and water when gas passes into the inlet port and through the filter element, and to release water via the inlet port when gas passes from the outlet port through the filter element. Also in the embodiment shown, the filter element is supported by cylindrical lattice support structure 15. The filter element itself is shown as cylindrical in shape, and completely surrounds the outlet port, such that all gas which passes between the ports must pass through the filter element. The housing 11 is shown as generally cylindrical in shape, although other geometric shapes will function as well.

Figure 2:
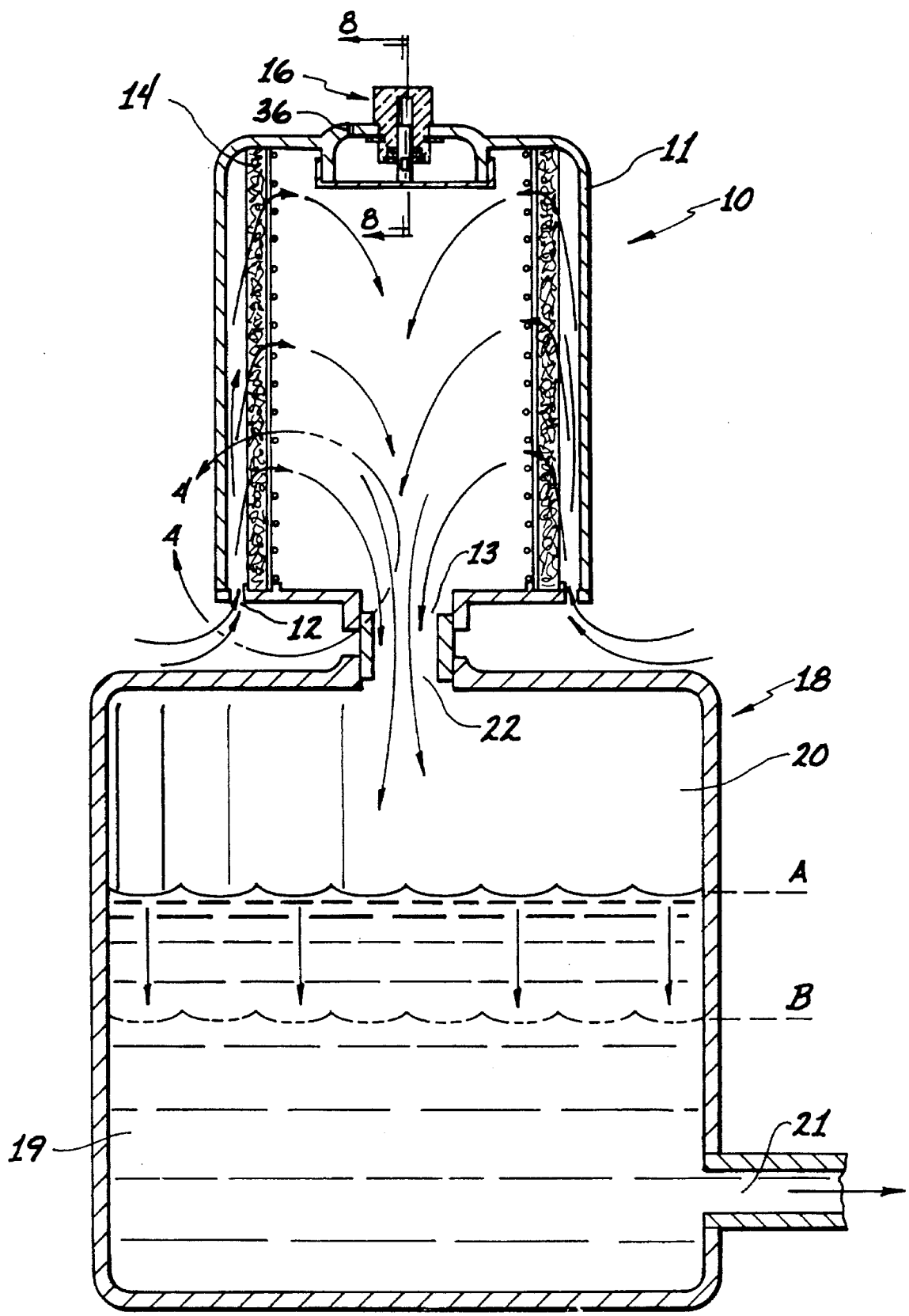
FIG. 2 is a sectional view of the filter of the invention installed on an oil reservoir, illustrating air flow as the oil level in the reservoir is falling.
Figure 3:
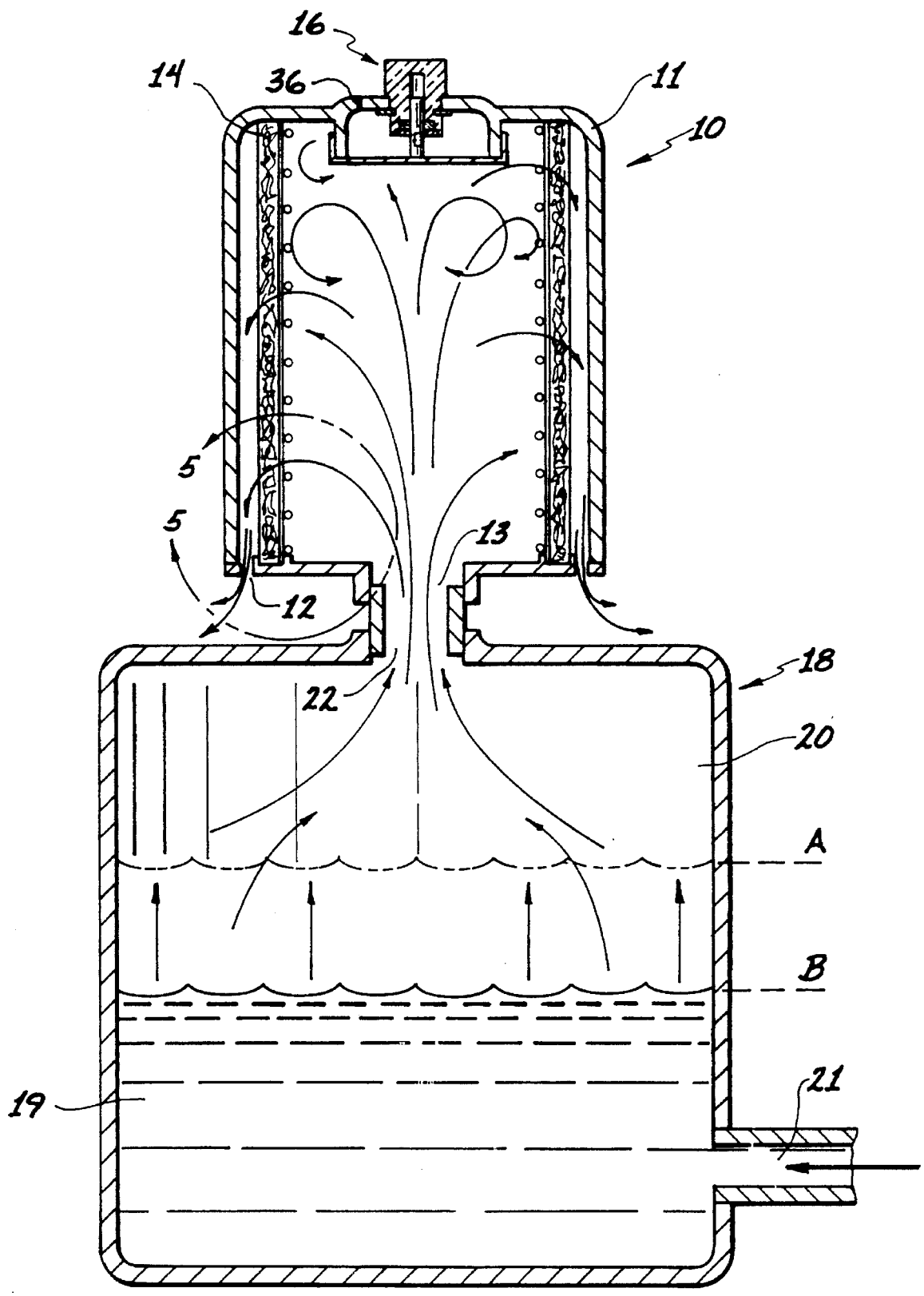
FIG. 3 is a view similar to that of FIG. 2, except the oil level is rising.

FIGS. 2 and 3 illustrate general operation of the filter. FIG. 2 is a sectional view of filter 10 mounted to oil reservoir 18. The filter may be mounted to the oil reservoir by any suitable and well known means, such as a standard pipe fitting. In the embodiment shown, outlet 13 of the filter communicates with inlet 22 of reservoir 18. It should be noted that FIGS. 2 and 3 are purposely not drawn to scale (the reservoir is actually much larger than the filter) to better illustrate the gas flow through the filter.

Reservoir 18 functions as a storage tank for hydraulic fluid (typically oil) 19, which is used to power hydraulic equipment (not shown) via fluid outlet 21. As the hydraulic equipment operates, the fluid level in the reservoir rises and falls. An air space 20 varies in volume as the fluid level fluctuates. In operation, as the fluid level falls from level A to level B as shown in FIG. 2, air space 20 expands, and a vacuum is created which draws ambient air from the atmosphere through inlet port 12, through filter element 14 and through outlet port 13 into the reservoir. When the fluid level rises from level A to level B as shown in FIG. 3, the air space contracts, and exhaust air is forced out of the reservoir through outlet 13, through filter 14 and escaping to the atmosphere through inlet 12.

Figure 4:
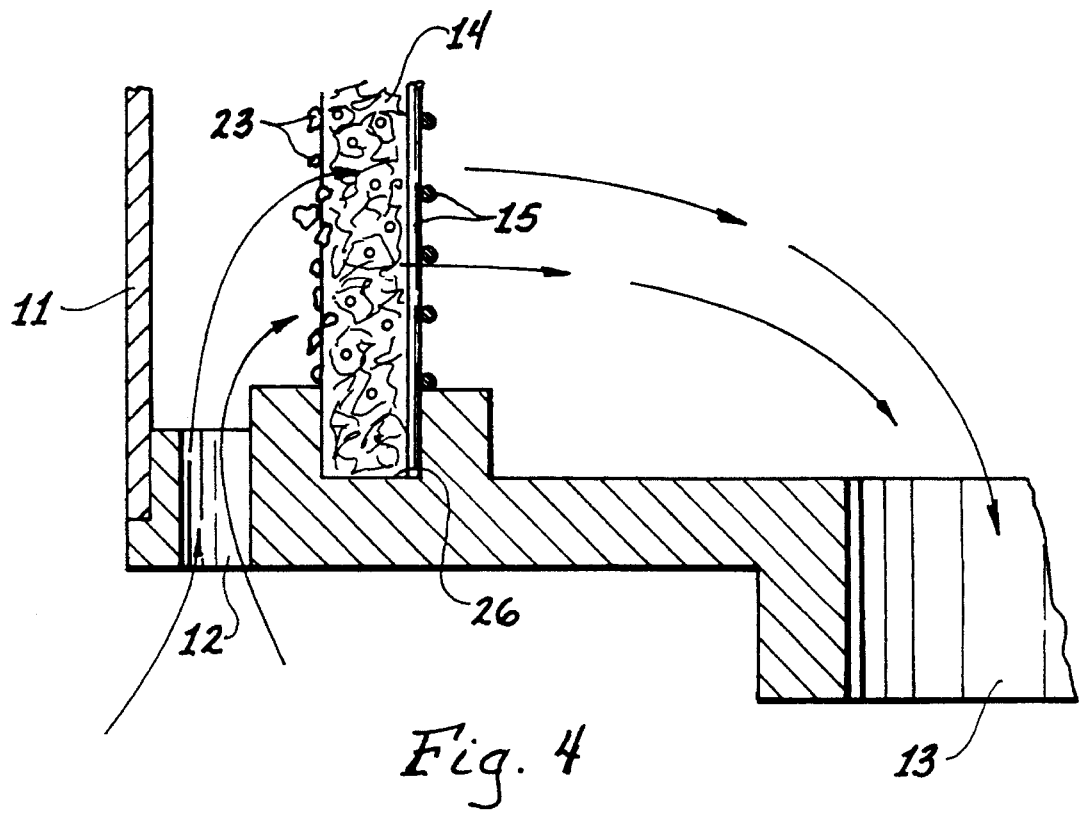
FIG. 4 is an enlarged fragmentary sectional view of the filter shown in FIG. 2, taken generally along line 4—4 of FIG. 2, and illustrating air flow into the filter from ambient atmosphere and into the oil reservoir.
Figure 5:
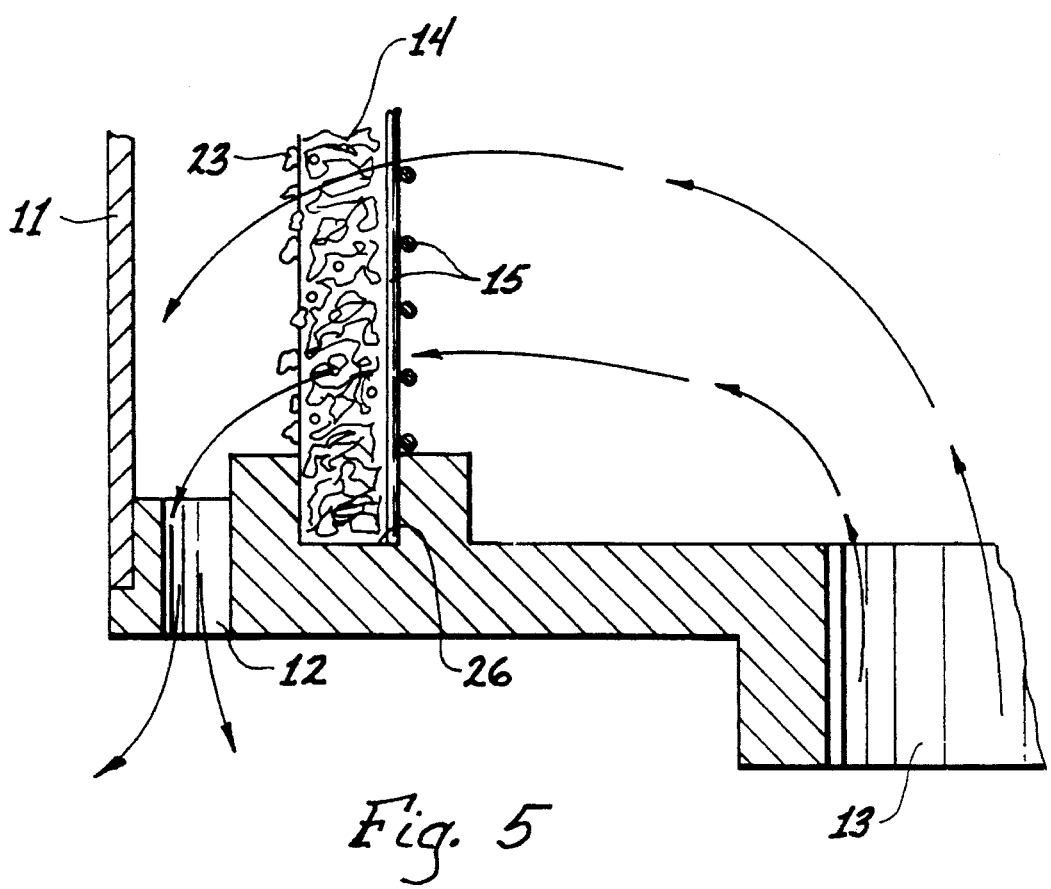
FIG. 5 is an enlarged fragmentary sectional view of the filter shown in FIG. 3, taken generally along line 5—5 of FIG. 3, and illustrating air flow out of the oil reservoir, through the filter and to the ambient atmosphere.

It is essential that water and dust particles be removed or filtered from the incoming air, as water and dust contaminate the fluid and cause abrasive wear and corrosion of the system components. Referring to FIGS. 4 and 5, filter 14 is comprised of a substrate treated with a hydrophilic substance. The substrate is selected from the group consisting of foamed polyurethane, polyester felt, polyethylene fibers and cellulosic paper. The hydrophilic substance is selected from the group consisting of lithium chloride, calcium chloride, polyacrylic acid, polyvinylpyrrolidone, polyvinyl alcohol, glycol, and glycerine.

In a preferred embodiment, the filter media (substrate plus hydrophilic substance) is available from Lydall International, Westex Division, P.O. Box 109, Hamptonville, N.C. 27020 (part no. 1B-163 5). The filter media is available in rolls, and therefore must be cut to length, rolled, and seamed at a butt joint with a suitable adhesive. Alternatively, the media may be manufactured by soaking a non-woven polyester felt having a Frazier rating of 25 CFM at ½" water column in a bath of concentrated lithium chloride in water until the polyester is completely wetted by the brine. The media should then be air dried to drive off the water. The media may then be cut using any conventional cutter such as scissors or shears. The media is then fitted to the support core 15 and the seam joined and sealed with a polyester hot melt. As shown in FIGS. 4 and 5, the filter element is secured in annular groove 26 of housing 11.

In operation, as illustrated in FIG. 4, filter 14 filters solid particulate (dust) 23 from incoming air entering through inlet port 12, and also functions to remove water from the air as well. Thus, the filter functions as a deliquescent desiccant, and the air flowing toward outlet port 13 is both clean and dry.

As illustrated in FIG. 5, air leaving outlet port 13 is forced again through filter 14, which may discharge solid particulates which were previously trapped in the filter. Filter 14 also functions to release water captured in the filter when air passed from inlet to outlet, to the air leaving the filter through inlet port 12. Thus, the filter regenerates its ability to remove moisture from air when air passes through the filter from the outlet to the inlet. It should be noted that the fluid in the reservoir is heated as a result of work done in the hydraulic system, and the air space 20 is therefore at a higher temperature than ambient temperature, which facilitates filter operation.

Figure 6:
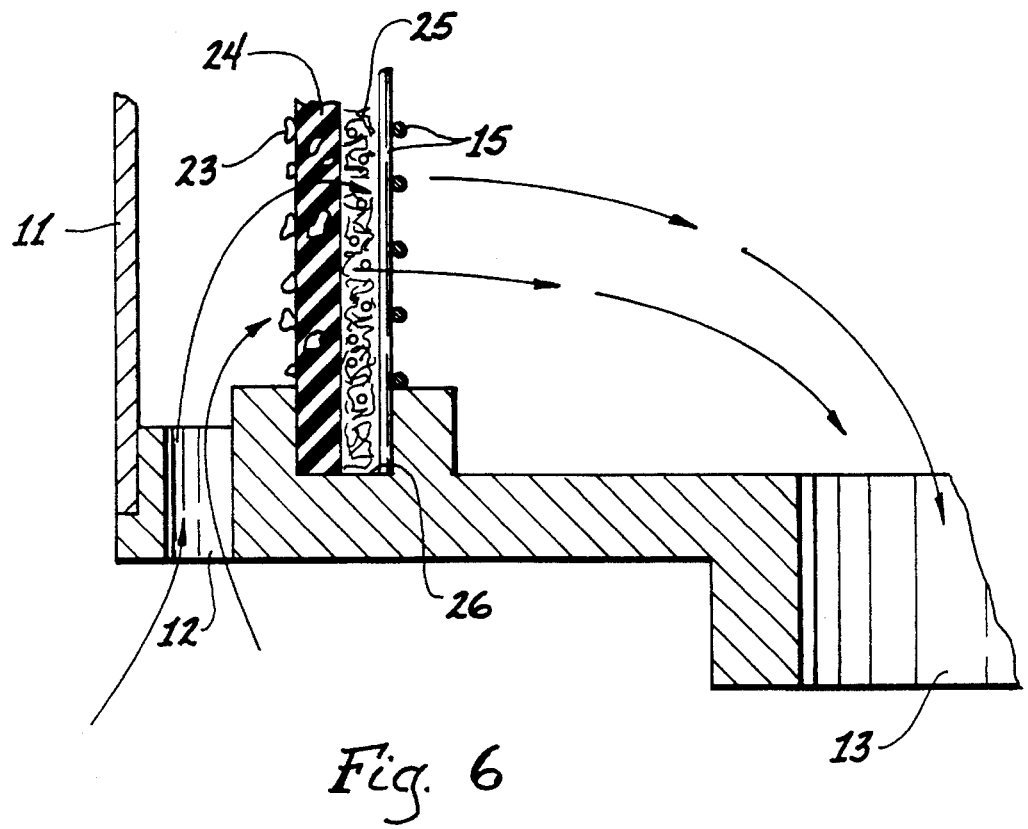
FIG. 6 is a view similar to that of FIG. 4, except depicting a second embodiment of the present invention, where the filter comprises two separate elements.
Figure 7:
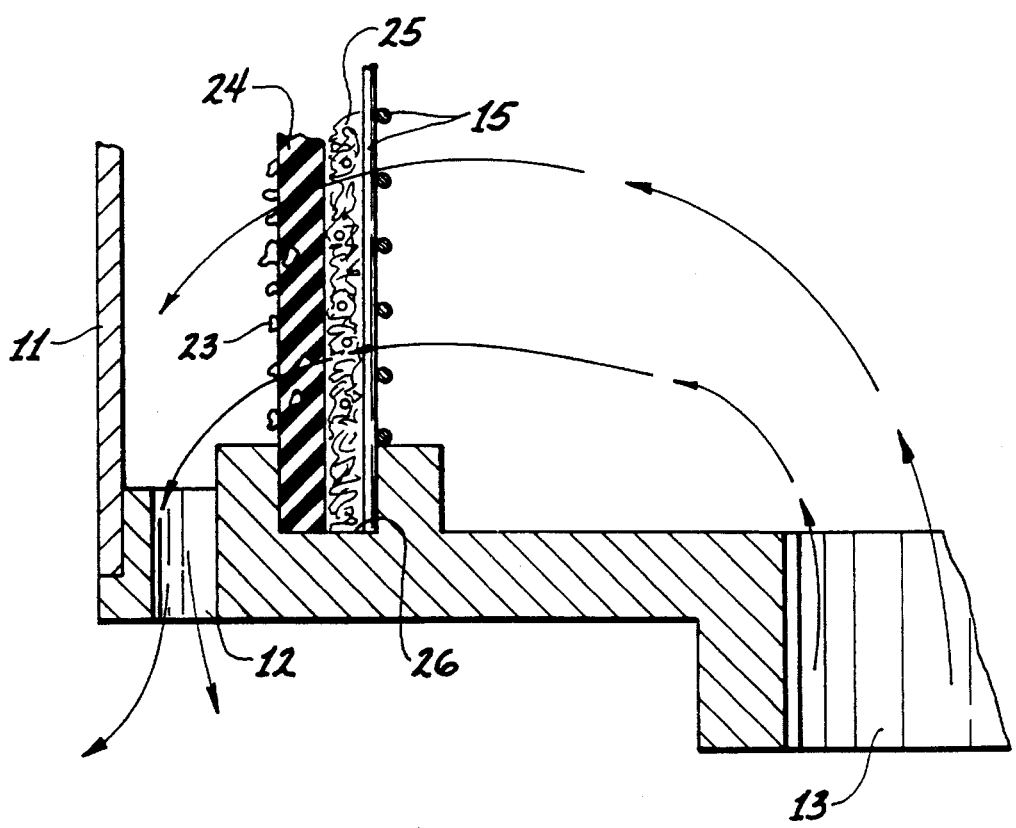
FIG. 7 is a view similar to that of FIG. 5, except depicting a second embodiment of the present invention, where the filter comprises two separate elements.

FIGS. 6 and 7 illustrate a second embodiment of the present invention, wherein the filter element comprises a first filter element 24 for filtering solid particulate matter and a separate second filter element 25 having a hydrophilic substance therein for removing moisture from gas when gas passes through the second filter element in a first direction (shown in FIG. 6) and for releasing moisture when gas passes through the second filter element in a second direction (shown in FIG. 7). FIGS. 6 and 7 illustrate operation of the second embodiment as shown and described with respect to FIGS. 4 and 5, respectively, for the first embodiment.

Figure 8:
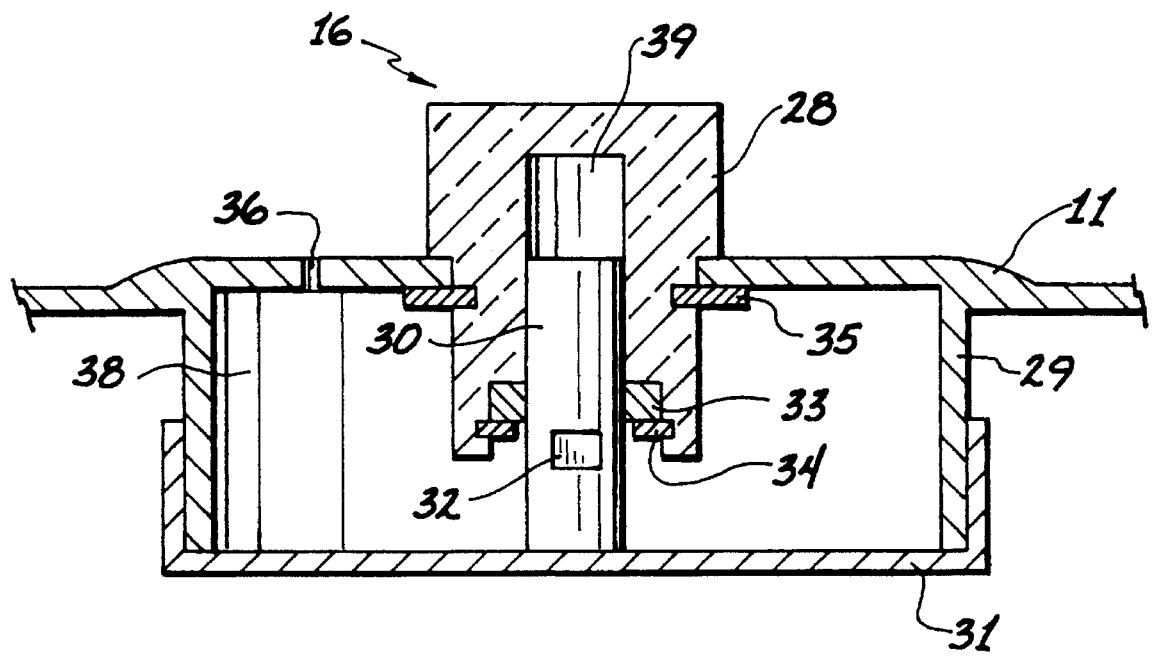
FIG. 8 is a fragmentary enlarged cross-sectional view taken generally along line 8—8 of FIG. 2, showing the filter in an unclogged condition.

As shown in FIG. 1, mounted at the top of housing 11 is indicator assembly 16, which functions to indicate when the filter is clogged and in need of maintenance. FIG. 8 is a fragmentary enlarged cross-sectional view of the indicator assembly, taken generally along line 8—8 of FIG. 2. Lens 28, which is translucent or transparent, is mounted to housing 11 by retaining ring 35. Cylindrical projection 29 extends downwardly from the top inner surface of the housing. Diaphragm 31 is fixedly secured to projection 29 to form substantially closed chamber 38. The chamber is not completely closed, however, as vent 36 provides a means for air to enter or leave the chamber. Lens 28 has a partial through-bore 39. Poppet 30 is arranged for sliding movement within the partial through-bore. Ring magnet 33 (second magnet) is held in a recess within the lens by retaining ring 34. First magnet 32 is mounted within poppet 30. Under normal operating conditions the two magnets repel one another and poppet 30 is forced downwardly to contact the upper surface of the diaphragm. This normal orientation is illustrated in FIG. 8.

Figure 9:
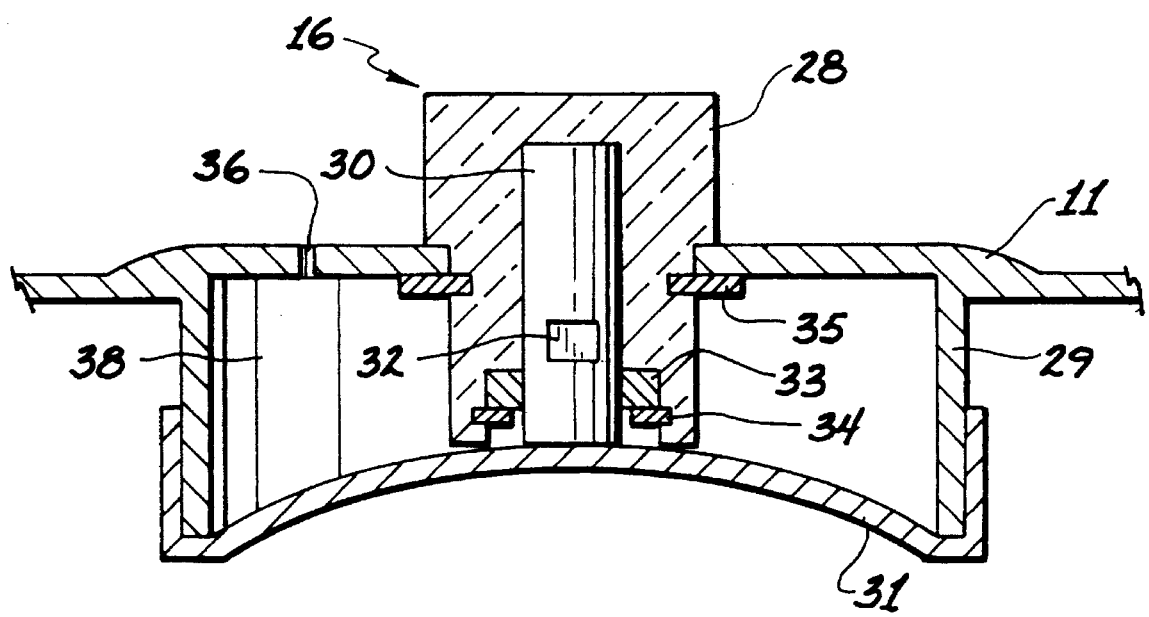
FIG. 9 is a view similar to that of FIG. 8, except showing the filter in a clogged condition.

When the filter becomes clogged, pressure will increase within the filter, causing diaphragm 31 to deflect upwardly as illustrated in FIG. 9. This upward deflection is sufficient to move first magnet 32 above second magnet 33, such that both magnets repel one another, causing poppet 30 to travel upwardly in bore 39 as far as possible. In a preferred embodiment, the poppet is of a different color than the lens (i.e., red), and the red indicator is clearly visible through the lens.

Therefore, while two embodiments of the invention have been shown and described, and several modifications thereof discussed, persons skilled in this art will readily appreciate that various additional changes and modifications may be made without departing from the spirit of the invention, as defined and differentiated by the following claims.

What is claimed is:

1. A regenerative hygroscopic filter comprising:

a housing containing an inlet port and an outlet port; and, a hydrophilic filter element positioned within said housing between said inlet and outlet ports, and operatively arranged to filter solid particulate matter and water when gas passes into said inlet port and through said filter element, and to release water via said inlet port when gas passes from said outlet port through said filter element, wherein said filter element comprises an inherently gas permeable substrate treated with a hydrophilic substance, wherein said substrate is impervious to solid particulate matter.

2. A filter as recited in claim 1 wherein said inlet port communicates with atmosphere and said outlet port communicates with an air space within a reservoir containing hydraulic fluid.

3. A filter as recited in claim 2 wherein said filter element has an ability to remove water from air and said element regenerates its ability to remove water from air each time air passes through said filter element from said outlet port to said inlet port, thereby releasing water to the atmosphere, wherein the air which passes through said filter element from said outlet port to said inlet port is warmer than air which previously passed through said filter element from said inlet port.

4. A filter as recited in claim 1 wherein said substrate is selected from the group consisting of foamed polyurethane, polyester felt, polyethylene fibers and cellulosic paper.

5. A filter as recited in claim 1 wherein said hydrophilic substance is selected from the group consisting of lithium chloride, calcium chloride, polyacrylic acid, polyvinylpyrrolidone, polyvinyl alcohol, glycol, and glycerine.

6. A filter as recited in claim 1 wherein said filter element comprises a first filter element for filtering solid particulate matter and a separate second filter element having a hydrophilic substance therein for removing moisture from gas when gas passes through said second filter element in a first direction and for releasing said moisture when gas passes through said second filter element in a second direction.

7. A filter as recited in claim 1 further comprising a magnetic indicator mounted to said housing and operatively arranged to provide a visual indication when said filter becomes clogged and is in need of cleaning or replacement.

8. A filter as recited in claim 7 wherein said magnetic indicator comprises:

a lens mounted to said housing and having a partial through-bore therein;

a diaphragm mounted to an internal projection of said housing and positioned to create a substantially closed chamber between said diaphragm, said projection and said lens, said diaphragm operatively arranged to deflect when said filter becomes clogged;

a poppet arranged in contact with a surface of said diaphragm, and arranged for movement within said partial through-bore, said poppet having a first magnet therein; and, a second magnet located within said lens and operatively arranged to repel said first magnet of said poppet in a first direction when said diaphragm is undeflected, and to repel said first magnet of said poppet in a second direction when said diaphragm is deflected, to indicate that said filter is clogged.

9. A method of filtering intake air and exhaust air in a hydraulic system having a hydraulic reservoir with an air space above hydraulic fluid in said reservoir, comprising:

filtering solid particulate matter and water from intake air which enters said reservoir by means of a regenerative hygroscopic filter; and, releasing water from said filter when exhaust air is removed from said air space, wherein said filtering is done with a filter element comprising a substrate treated with a hydrophilic substance.

10. A method as recited in claim 9 wherein said exhaust air is at a temperature higher than that of said intake air.

11. A method as recited in claim 10 wherein said filtering is done with a filter element comprising a first filter element for filtering solid particulate matter and a separate second filter element for removing water from said intake air and for releasing water to said exhaust air.

12. A method as recited in claim 9 wherein said substrate is selected from the group consisting of foamed polyurethane, polyester felt, polyethylene fibers and cellulosic paper.

13. A method as recited in claim 9 wherein said hydrophilic substance is selected from the group consisting of lithium chloride, calcium chloride, polyacrylic acid, polyvinylpyrrolidone, polyvinyl alcohol, glycol, and glycerine.

\* \* \* \* \*